UNITED STATES PATENT OFFICE.

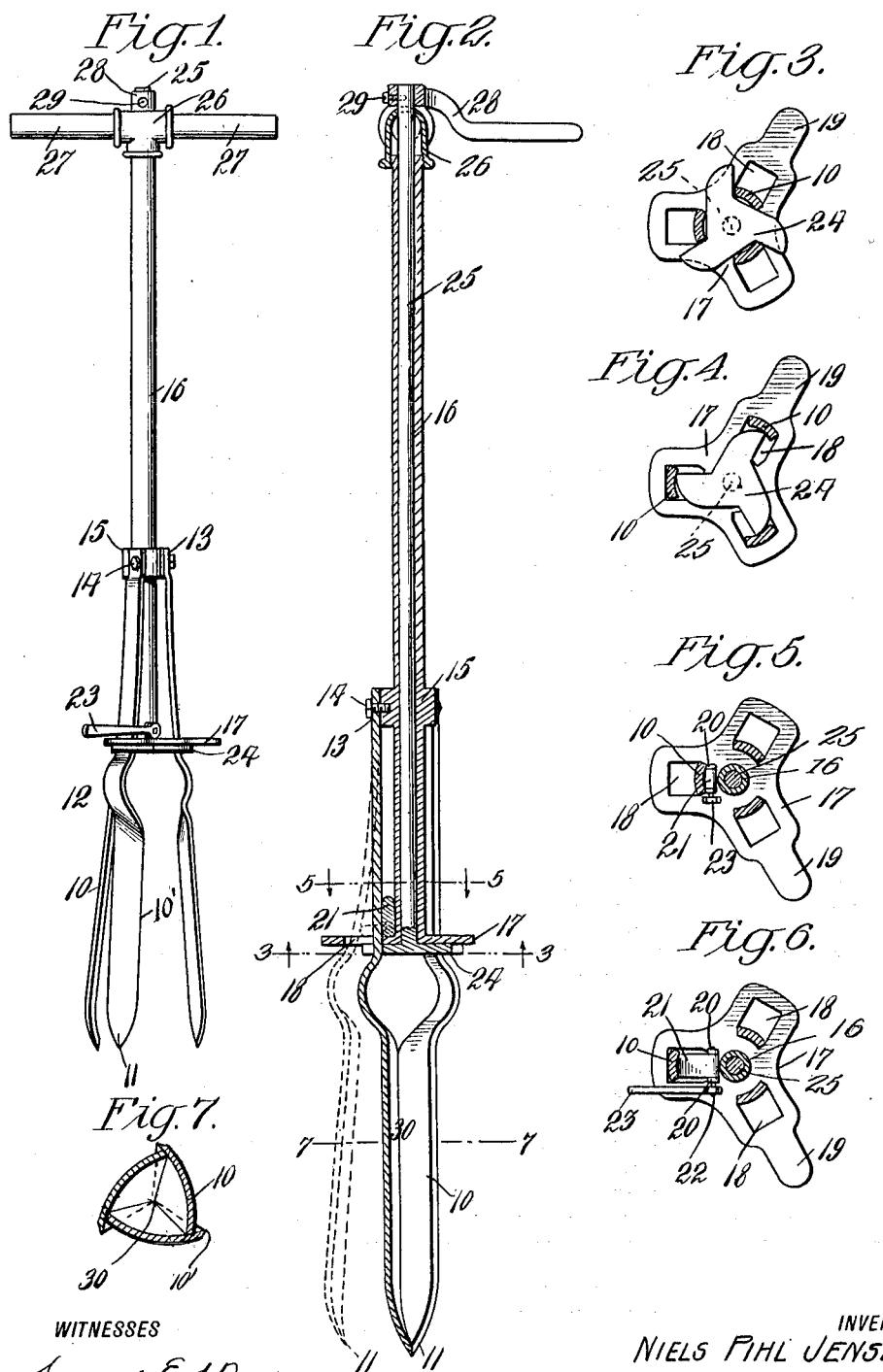

NIELS PIHL JENSEN, OF EPHRAIM, UTAH.

PLANTING IMPLEMENT.

1,053,730.

Specification of Letters Patent. Patented Feb. 18, 1913.

Application filed September 6, 1912. Serial No. 718,891.

*To all whom it may concern:*

Be it known that I, NIELS PIHL JENSEN, a citizen of the United States, and a resident of Ephraim, in the county of Sanpete and State of Utah, have invented a new and Improved Planting Implement, of which the following is a full, clear, and exact description.

This invention relates to planting implements and has reference more particularly to that class which comprises means for receiving the plant and then setting it into the desired place in the ground.

An object of the invention is to provide an inexpensive planting implement which can be easily and quickly manipulated, which will set the plant in any desired position in the ground without injury to the plant.

Another object of the invention is to provide a planting implement that will press the soil uniformly about the plant set in the ground.

Reference is to be had to the accompanying drawings forming a part of this specification, in which similar characters of reference indicate corresponding parts in all the figures, and in which—

Figure 1 is an elevation of an embodiment of my invention showing the implement ready to receive a plant; Fig. 2 is an elevated section of the same enlarged and showing the device when carrying a plant or planting, the dotted line indicating the same position as in Fig. 1; Fig. 3 is a section on the line 3—3 of Fig. 2 in the direction of the arrow and when all the knives are closed and supporting a plant, as in Fig. 2; Fig. 4 is a section on the same line as Fig. 3 but the knives are all spread thus releasing the plant; Fig. 5 is a section on the line 5—5 of Fig. 2 in the direction of the arrows showing the normal position of the knives; Fig. 6 is the same section as Fig. 5, with the position of one knife as indicated in dotted lines in Fig. 2; and Fig. 7 is a section on the line 7—7 of Fig 2, showing the normal position of the knives and the advance of the cutting edges of the knives.

Before proceeding to a more detailed description of my invention, it must be understood that while the drawing discloses an implement for planting pine trees especially, the same may be used for any plant by a certain modification in the shape or structure in accordance with the special conditions or individual preference, without departing from the underlying spirit of the invention.

Referring more particularly to the drawings, 10 are the knives, preferably made of lamina, and arched in their cross section, and the lower ends 11 of the knives 10 are inwardly curved and pointed. Near their middle a portion 12 of the knife is outwardly curved, the purpose of which will appear later. A forward cutting edge 10' is formed between the lower end and the outwardly curved part 12 so as to project out of the next back edge of the knife ahead, as shown in Fig. 7; thus when the implement is turned to the right the knives will cut and force the soil toward the center. The upper ends 13 of the knives 10 are fixed by means of bolts 14 to a collar 15 provided on a tubular standard 16, the lower end of the tubular standard having a flange 17 normal to the standard and provided with the same number of rectangular radiating apertures 18 as there are knives 10. Into these apertures the knives then project and they are guided in the same and limited in their radial motion. The flange 17 is provided with a handle 19 for supporting and manipulating the implement, its contour being such as to reduce the weight of the flange to a minimum, leaving to it the required strength.

On the upper face of the flange 17 central with one of the radial apertures 18 and near the standard two lugs 20 are formed, and journaled in and between the lugs is a push block 21 bearing with one of its wider surfaces against one of the knives 10 projecting through the orifice which is central with the lugs and block. The push block 21, having one end of its rotating pin 22 projecting through one of the lugs 20, is provided with a handle 23 rigidly fixed to the pin 22, and by means of this handle the push block 21 is operated so as to force the knife 10 bearing against it radially away from the center. The knives normally due to their resiliency, are forced toward the center.

Directly under the lower face of the flange 17, concentric with and bearing against the face is a cam 24 adapted to engage all the knives 10 simultaneously when operated through the medium of a vertical rod 25, which is preferably integral with the cam.

The rod 25 is journaled in the tubular standard 16 and is concentric with it. The rod 25 projects through the T 26 threaded on the upper end of the tubular standard 16. Handles 27 are screwed on each side of the T, and by means of these handles the implement is manipulated. On the projecting end of the vertical rod 25 a wrench 28 is attached by a set screw 29. The motion of the wrench 28 is limited by the T 26 on the standard 16 interfering with the bent portion of the wrench 28, so that the knives by the motion of the wrench to the right and the cam 24 forces the knives radially away from the center or spreads them, as can be seen from the drawing. By bringing the wrench 28 to the original position, the knives due to their resiliency, will recede to their normal position.

The operation of the implement is as follows: The plant that is to be planted is placed in the implement by forcing the handle 23 of the push block 21 from vertical to horizontal position. Thus the push block 21 forces the knife bearing against the block away radially from the center, leaving an opening for the plant to be admitted into the implement, as shown in Fig. 2 in dotted lines, and in Figs. 1 and 6 in full, the root of the plant taking place in space 30 between the parts of the knife below the outwardly curved portion 12 and the foliage of the plant in the enlargement between the knives formed by the outwardly curved portions 12. Then the handle 23 and the push block 21 are restored to the original position and consequently the knife returns also due to its spring action produced by the attachment of the end 13, and incloses the plant in the implement. To place the plant in the ground, the implement containing the plant is with the lower ends 11 of the knives 10 placed on the ground keeping the implement vertical, with each hand on each handle 27. Then a vertical downward force is applied on the handles 27 thus forcing the knives containing the plant in the ground until the enlarged portions of the knives reach the ground. By grasping with one hand the handle 19 of the flange 17 and with the other turning the wrench 28 to the right the knives 10 are by the cam 24 spread radially as shown in Fig. 4, the knives being guided in the apertures 18 of the flange 17 and limited in their motion by said apertures. Thus the plant is released from the implement in the ground. Now by taking hold of the handles 27 and rotating the implement, the knives 10 will cut the ground with the edges 10′ and press the soil against the root of the plant. The knives after a revolution will have their lower extremities 11 also forced apart by the ground forced between them and the implement may be removed. By turning the wrench 28 to its original position the knives are also restored and the implement is ready for the next planting.

The lower extremities of the knives below the outwardly enlarged portion form together a prism finishing into a pyramid and having the cutting lateral edges of the knives forming the above figure projecting forward, as shown in Fig. 7. The apex of the pyramid facilitates the entrance of the implement in the ground and prevents the soil from entering between the knives as the pressure of the soil tends to increase the pressure toward the center, and the lateral projecting edges of the knives facilitate the cutting of the ground and allow a certain head for the knife. The twist of the blades through an angle of 45° (see Fig. 1) adds still more to their cutting action.

Having thus described my invention, I claim as new and desire to secure by Letters Patent:

1. In a device of the class described, comprising a standard, a plurality of resilient knives vertically and centrally disposed and associated with said standard, means for rigidly securing the upper ends of said knives to said standard, said knives being adapted to receive a plant, and means associated with said standard and said knives for opening same whereby a plant may be set in any desired place in the ground without injury to it.

2. In a device of the class described, comprising a standard, a plurality of knives vertically and centrally disposed and associated with said standard, means at the lower end of said standard adapted to guide said knives, and means on said means to force one of the said knives radially away from the center whereby a plant may be placed between said knives.

3. In a device of the class described, comprising a standard, a plurality of knives vertically and centrally disposed and associated with said standard, a flange at the lower end of said standard having means to radially guide said knives and limit their motion, and means associated with said standard and knives whereby said knives may be radially forced away from the center and thereby release a plant contained between said knives.

4. In a device of the class described, comprising a standard, a plurality of knives vertically and centrally disposed and associated with said standard, said knives normally bearing one against the other at their lower ends and forming together at the same ends a prism finishing into a pyramid and concentric with said prism, the lateral edges of said prism and pyramid formed by said knives being the cutting edges of the knives and projecting out of the so-formed figure, and means associated with said knives and standard whereby said knives can be spread apart radially from the center and maintained spread.

5. In a device of the class described, comprising a standard having at its upper end means for manipulating said standard and a flange at its lower end, a plurality of knives vertically and centrally disposed and associated with said standard and flange, means in said flange to receive and guide said knives radially and limit the outward motion of said knives, and means associated with said standard and knives whereby said knives may be moved outwardly.

6. In a device of the class described, comprising a standard having at its upper end means for operating said standard and at its lower end a flange, a plurality of knives vertically and centrally disposed and associated with said standard and flange, means in said flange for receiving and guiding said knives, a push block positioned on said flange and associated with one of said knives whereby said knife may be forced radially outward, and means associated with said standard and knives whereby said knives can be simultaneously forced radially outward.

7. In a device of the class described, comprising a tubular standard having at its upper end means for operating said standard and at its lower end a flange, a plurality of knives vertically and centrally disposed and associated with said standard and flange, means in said flange for receiving and guiding said knives, a vertical rod journaling in said tubular standard and projecting through it and concentric with it, a wrench associated with the outwardly-projecting end of said vertical rod, and a cam formed at the lower projecting end concentric with said rod and positioned between said knives whereby said knives may be simultaneously radially spread.

8. In a device of the class described, comprising a tubular standard having a flange with a handle at its lower end, a collar near said flange and means for manipulating said standard at its upper end, a plurality of knives vertically and centrally disposed and attached to said collar of said standard, means in said flange through which said knives project and by which said knives are radially guided and limited in their motion from their centers, a push block associated with the upper face of said flange and one of said knives whereby said knife may be eccentred, a rod journaling in said standard and concentric with it having its upper and lower ends projecting out of said standard, a wrench associated with the upper projecting portion of said rod and a cam associated with the lower projecting portion concentric with said rod, said cam bearing against the lower surface of the flange and inclosed between said knives, said knives having a central enlarged portion positioned below said cam to accommodate the foliage of a plant, and a prism finishing into a pyramid formed by the knives below said central enlarged portion and having their lateral cutting edges projecting out of said figure formed by said lower portions of the knives.

In testimony whereof I have signed my name to this specification in the presence of two subscribing witnesses.

NIELS PIHL JENSEN.

Witnesses:
GEORGE QUINN,
U. B. VOGLE.

Copies of this patent may be obtained for five cents each, by addressing the "Commissioner of Patents, Washington, D. C."